(12) United States Patent
Bockelmann et al.

(10) Patent No.: US 7,489,101 B2
(45) Date of Patent: Feb. 10, 2009

(54) BATTERY CONTROL SYSTEM FOR HYBRID VEHICLE AND METHOD FOR CONTROLLING A HYBRID VEHICLE BATTERY

(75) Inventors: Thomas R. Bockelmann, Battle Creek, MI (US); Mark E. Hope, Marshall, MI (US); Zhanjiang Zou, Battle Creek, MI (US); Xiaosong Kang, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/936,370

(22) Filed: Sep. 8, 2004

(65) Prior Publication Data

US 2006/0049797 A1 Mar. 9, 2006

(51) Int. Cl.
*H02J 7/00* (2006.01)
*H02J 7/14* (2006.01)

(52) U.S. Cl. ..................................... 320/104
(58) Field of Classification Search ............... 320/104, 320/132, 103
See application file for complete search history.

(56) References Cited

U.S. PATENT DOCUMENTS

| | | | |
|---|---|---|---|
| 4,354,144 A * | 10/1982 | McCarthy | 318/13 |
| 5,883,496 A * | 3/1999 | Esaki et al. | 320/132 |
| 6,574,546 B2 * | 6/2003 | Nada | 701/110 |
| 6,583,599 B1 * | 6/2003 | Phillips et al. | 320/104 |
| 2001/0026142 A1 * | 10/2001 | Furukawa et al. | 320/103 |
| 2003/0132730 A1 * | 7/2003 | Ochiai | 320/104 |
| 2003/0173932 A1 * | 9/2003 | Toya et al. | 320/104 |

FOREIGN PATENT DOCUMENTS

| | | |
|---|---|---|
| DE | 10127782 A1 | 1/2002 |
| EP | 1151892 A2 | 7/2001 |
| EP | 1122857 A2 | 8/2001 |
| JP | 11008910 A | 1/1999 |

* cited by examiner

*Primary Examiner*—Edward Tso
*Assistant Examiner*—Alexis Boateng
(74) *Attorney, Agent, or Firm*—Dykema Gossett PLLC

(57) ABSTRACT

A battery control system for hybrid vehicle includes a hybrid powertrain battery, a vehicle accessory battery, and a prime mover driven generator adapted to charge the vehicle accessory battery. A detecting arrangement is configured to monitor the vehicle accessory battery's state of charge. A controller is configured to activate the prime mover to drive the generator and recharge the vehicle accessory battery in response to the vehicle accessory battery's state of charge falling below a first predetermined level, or transfer electrical power from the hybrid powertrain battery to the vehicle accessory battery in response to the vehicle accessory battery's state of charge falling below a second predetermined level. The invention further includes a method for controlling a hybrid vehicle powertrain system.

27 Claims, 2 Drawing Sheets

BATTERY CONTROL SYSTEM FOR HYBRID VEHICLE AND METHOD FOR CONTROLLING A HYBRID VEHICLE BATTERY

This invention was made with Government support under NREL Subcontract No. ZCL-2-32060-01, Prime Contract DE-AC36-99GO10337 awarded by the Department of Energy. The government has certain rights in this invention.

BACKGROUND OF THE INVENTION

1.. Field of the Invention

The present invention relates generally to hybrid motor vehicles and, more particularly, to a battery control system for controlling the state of charge of a hybrid vehicle battery.

2.. Background of the Invention

Motor vehicle manufacturers are actively working to develop alternative powertrain systems in an effort to reduce the level of pollutants exhausted into the air by conventional powertrains equipped with internal combustion engines. Significant development efforts have been directed to electric and fuel-cell vehicles. Unfortunately, these alternative powertrain systems suffer from several disadvantages and, for all practical purposes, are still under development. However, "hybrid" vehicles, which are equipped with an internal combustion engine and an electric traction motor that can be operated independently or in combination with the internal combustion engine to provide motive power for the vehicle, offer a compromise between traditional internal combustion engine powered vehicles and full electric powered vehicles.

A hybrid vehicle is typically equipped with a relatively high voltage hybrid powertrain battery, for example a 340 V battery, which provides electrical power to the electric traction motor. Many hybrid vehicles are also equipped with a lower voltage battery, for example a 12 V battery, which provides power to various vehicle accessories, such as the vehicle radio, lights and other electrically operated equipment not powered by the hybrid powertrain battery. The charge level of the vehicle batteries is monitored according to an index known as the battery State of Charge, or SOC. The SOC is defined by a ratio of the amount of residual charge remaining in a battery relative to its full charge capacity. Presently, a battery's SOC may be measured using a combination of a measurement method utilizing a correlation between SOC and a battery's voltage-current characteristics at the time of charging (or discharging) and a measurement method utilizing an accumulation of charged and discharged amounts.

In many hybrid vehicles, a battery control system controls charging (and discharging) of a battery based on the SOC. A limitation of many hybrid battery control systems is that they fail to manage the lower voltage battery's charge level as it supplies power to the vehicle accessories, particularly when the internal combustion engine is turned off. Failure to manage the lower voltage battery may result in the battery becoming depleted. Accordingly, a need exists for an improved battery control system for a hybrid vehicle that monitors and controls a charged state of the lower voltage vehicle accessory battery to prevent the battery from becoming depleted.

SUMMARY OF THE INVENTION

The present invention includes a battery control system for controlling a hybrid powertrain system to, among other things, maintain a predetermined level of charge in a vehicle accessory battery. In an embodiment of the invention, the battery control system includes a hybrid powertrain battery, a vehicle accessory battery, and a prime mover driven generator adapted to charge the vehicle accessory battery. The battery control system also includes a detecting arrangement configured to monitor the vehicle accessory battery's state of charge. A controller is configured to activate the prime mover to drive the generator and recharge the vehicle accessory battery in response to the vehicle accessory battery's state of charge falling below a first predetermined level, or transfer electrical power from the hybrid powertrain battery to the vehicle accessory battery in response to the vehicle accessory battery's state of charge falling below a second predetermined level. The invention further includes a method for controlling a hybrid vehicle powertrain system.

BRIEF DESCRIPTION OF THE DRAWINGS

Embodiments of the invention will now be described, by way of example, with reference to the accompanying drawings, wherein.

DETAILED DESCRIPTION

Figure 1:
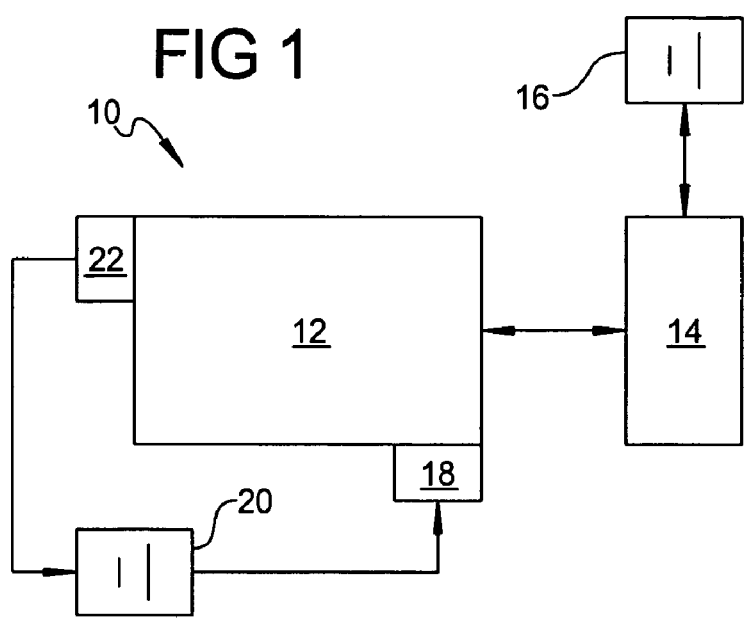
FIG. 1 is a block diagram schematically illustrating the overall structure of a hybrid vehicle powertrain that includes a battery control system according to an embodiment of the present invention.

FIG. 1 is a block diagram schematically showing the overall structure of a hybrid vehicle powertrain 10 suitable for use with a battery control system according to an embodiment of the present invention. In the illustrated embodiment, hybrid vehicle powertrain system includes a first prime mover 12, such as a diesel or gasoline powered internal combustion engine, and a second prime mover 14, such as an electric traction motor. When second prime mover 14 functions as an electric traction motor, for example, hybrid vehicle powertrain 10 may also include a hybrid powertrain battery 16, such as a 340 V Nickel Metal Hydrogen (NiMH) battery or the like. When first prime mover 12 functions as an internal combustion engine, for example, powertrain system 10 may include an electric starter motor 18 for cranking the engine. In the illustrated embodiment, starter motor 18 is powered by a vehicle accessory battery 20, such as a 12 V lead acid battery. To maintain an adequate level of charge in battery 20, hybrid vehicle powertrain 10 may also include a first prime mover driven generator 22, such as an alternator, that is provided in electrical communication with vehicle accessory battery 20.

Figure 2:
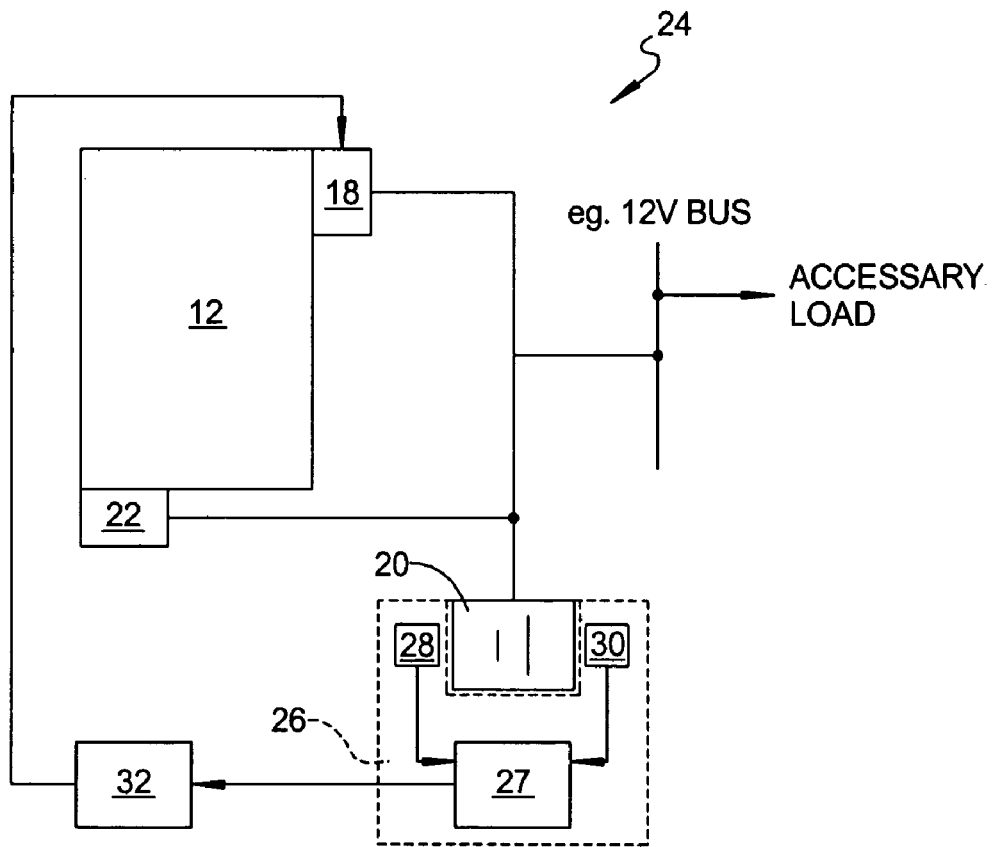
FIG. 2 is a block diagram schematically illustrating the overall structure of a battery control system according to an embodiment of the present invention.

Referring to FIG. 2, a battery control system 24 according to an embodiment of the present invention is shown. In the illustrated embodiment, battery control system 24 includes vehicle accessory battery 20 and first prime mover driven generator 22, which is adapted to charge vehicle accessory battery 20. As shown in FIG. 2, battery control system 24 may also include a detecting arrangement 26 configured to monitor the vehicle accessory battery's State of Charge (SOC). In an embodiment, detecting arrangement 26 includes a battery control unit (BCU) 27, such as an electronic control unit. The voltage in battery 20 may be measured by a voltage sensor 28 and a current sensor 30 may be used to measure charged and discharged current with respect to battery 20. The voltage and current measurements are supplied to BCU 27, which accumulates charged or discharged voltage and current measurements with respect to battery 20 for determination of the battery 20 SOC.

In an embodiment, BCU 27 outputs the determined SOC to a hybrid vehicle control unit (HVCU) 32, such as an electronic control unit. Based on the SOC input from BCU 27, the HVCU 32 is configured to control operation of, among other things, first prime mover 12 to drive generator 22 and produce electrical energy needed to recharge battery 20 in response to the vehicle accessory battery's SOC falling below a predetermined level. For example, when the vehicle accessory battery's SOC is too low to support the vehicle accessory load, the HVCU 32 may command the internal combustion engine to start, which operates generator 22 to charge battery 20 and provide power for the vehicle accessory load. After battery 20 has been charged to a predetermined level, the HVCU 32 will turn the internal combustion engine off.

Figure 3:
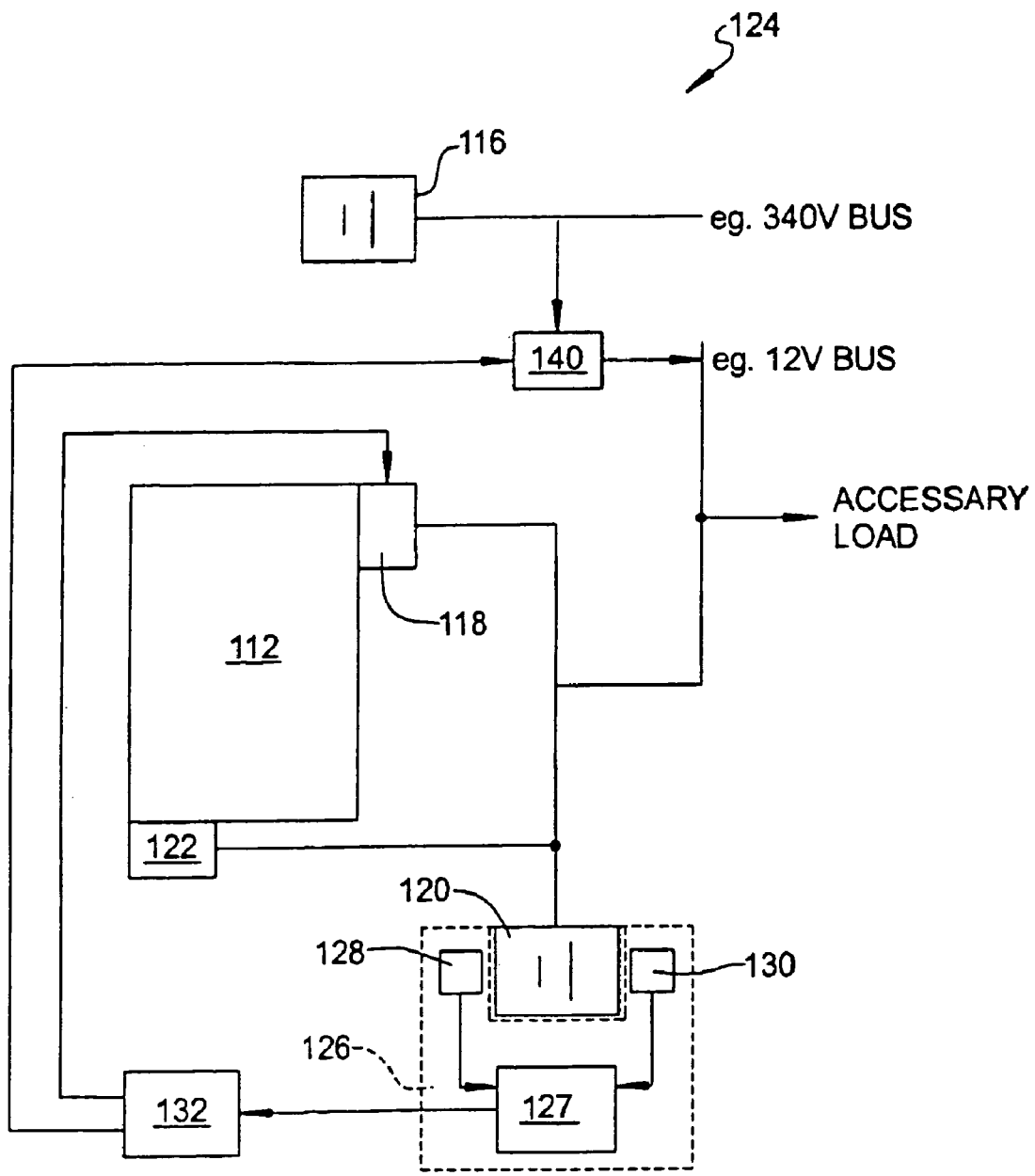
FIG. 3 is a block diagram schematically illustrating the overall structure of a battery control system according to another embodiment of the present invention.

Referring to FIG. 3, a battery control system 124 according to another embodiment of the present invention is shown. Battery control system 124 is substantially similar to battery control system 24 described above with at least one addition, namely, a voltage converter 140 and hybrid powertrain battery 116. As in battery control system 24, BCU 127 functions to monitor the vehicle accessory battery's SOC and outputs the determined SOC to hybrid vehicle control unit (HVCU) 132. Based on the SOC input from BCU 127, the HVCU 132 is configured to control operation of, among other things, voltage converter 140 to transfer electrical power from hybrid powertrain battery 116 to vehicle accessory battery 120 in response to the vehicle accessory battery's state of charge falling below a predetermined level.

Voltage converter 140 converts the voltage level in hybrid powertrain battery 116 to the voltage level in vehicle accessory battery 120. As shown in FIG. 3, for example, voltage converter 140 may be used to step down the voltage in a 340 V hybrid powertrain battery bus to the voltage in a 12 V vehicle accessory battery bus.

In a particular operating mode, for example when the vehicle accessory battery's SOC is too low to support the vehicle accessory load, the HVCU 132 will command voltage converter 140 to transfer electrical power from hybrid powertrain battery 116 to charge battery 120 and provide power for the vehicle accessory load. If needed, HVCU 132 may also operate first prime mover 112 to drive the electric traction motor (FIG. 1) as a generator to charge hybrid powertrain battery 116 and provide power to charge battery 120 and/or operate the vehicle accessories via voltage converter 140. After vehicle accessory battery 120 has been charged to a predetermined level, the HVCU 132 will terminate the transfer of power between hybrid powertrain battery 116 and vehicle accessory battery 120 and operation of first prime mover 112 (if needed).

In another mode of operation, when the vehicle accessory battery's SOC is too low to support the vehicle accessory load, the HVCU 132 may command voltage converter 140 to transfer electrical power from hybrid powertrain battery 116 to charge battery 120 and provide power for the vehicle accessory load. Optionally, the HVCU 132 may also command the internal combustion engine to simultaneously operate generator 122 to charge battery 120 and provide power for the vehicle accessory load. Additionally, if needed, HVCU 132 may also operate first prime mover 112 to drive the electric traction motor as a generator to charge hybrid powertrain battery 116 and provide power to charge battery 120 and/or operate the vehicle accessories via voltage converter 140. After battery 120 has been charged to a predetermined level, the HVCU 132 will terminate the transfer of power between hybrid powertrain battery 116 and vehicle accessory battery 120 and operation of first prime mover 112 (if needed).

In the modes of operation described above, the predetermined SOC level in battery 120 that activates the recharging process may be the same or different for activation of generator 122 or voltage converter 140. For example, an SOC level below 15% may cause HVCU 132 to operate the generator 122 to recharge battery 120 and an SOC level below 10% may cause HVCU 132 to operate voltage converter 140 to charge battery 120.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A battery control system for a hybrid vehicle, comprising:
    a hybrid powertrain battery;
    a vehicle accessory battery;
    a prime mover driven generator adapted to charge the vehicle accessory battery;
    a detecting arrangement configured to monitor the vehicle accessory battery's state of charge; and
    a controller configured to:
        activate the prime mover to drive the generator and recharge the vehicle accessory battery in response to the vehicle accessory battery's state of charge falling below a first predetermined level, and
        transfer electrical power from the hybrid powertrain battery to the vehicle accessory battery in response to the vehicle accessory battery's state of charge falling below a second predetermined level,
        wherein the controller is configured to command the prime mover to start and to drive the generator to charge the vehicle accessory battery; wherein the controller is configured to command the prime mover to turn off once the vehicle accessory battery has been charged to a third predetermined level; and further wherein the third predetermined level is greater than the second predetermined level, and the second predetermined level is greater than the first predetermined level.

2. The battery control system of claim 1, wherein the detecting arrangement includes a battery control unit.

3. The battery control system of claim 1, wherein the detecting arrangement includes a voltage or current measuring sensor.

4. The battery control system of claim 1, wherein the prime mover driven generator is an alternator.

5. The battery control system of claim 1, wherein the prime mover driven generator is a hybrid motor-generator.

6. The battery control system of claim 1, wherein the controller includes a hybrid powertrain system controller.

7. The battery control system of claim 1, wherein the controller includes a voltage converter.

8. The battery control system of claim 1, wherein the controller is configured to simultaneously:
operate the prime mover to drive the generator and recharge the vehicle accessory battery in response to the vehicle accessory battery's state of charge falling below the first predetermined level, and
transfer electrical power from the hybrid powertrain battery to the vehicle accessory battery in response to the vehicle accessory battery's state of charge falling below the second predetermined level.

9. A battery control system for a hybrid vehicle, comprising:
a hybrid powertrain battery;
a vehicle accessory battery;
a prime mover electrical power generating means for charging the vehicle accessory battery;
detecting means for monitoring the vehicle accessory battery's state of charge; and
a controlling means for:
activating the prime mover electrical power generating means to recharge the vehicle accessory battery in response to the vehicle accessory battery's state of charge falling below a first predetermined level, and
transferring electrical power from the hybrid powertrain battery to the vehicle accessory battery in response to the vehicle accessory battery's state of charge falling below a second predetermined level,
wherein the controlling means is configured to command the electrical power generating means to start and to drive the generator to charge the vehicle accessory battery; wherein the controller is configured to command the prime mover to turn off once the vehicle accessory battery has been charged to a third predetermined level; and further wherein the third predetermined level is greater than the second predetermined level, and the second predetermined level is greater than the first predetermined level.

10. The battery control system of claim 9, wherein the detecting means includes a battery control unit.

11. The battery control system of claim 9, wherein the detecting means includes a voltage or current measuring sensor.

12. The battery control system of claim 9, wherein the generator means is an alternator.

13. The battery control system of claim 9, wherein the generator means is a hybrid motor-generator.

14. The battery control system of claim 9, wherein the controller means includes a hybrid powertrain system controller.

15. The battery control system of claim 9, wherein the controller means includes a voltage converter.

16. The battery control system of claim 9, wherein the controller means is configured for simultaneously:
operating the generator means to recharge the vehicle accessory battery in response to the vehicle accessory battery's state of charge falling below the first predetermined level, and
transferring electrical power from the hybrid powertrain battery to the vehicle accessory battery in response to the vehicle accessory battery's state of charge falling below the second predetermined level.

17. A method for controlling a hybrid vehicle powertrain system, comprising the steps of:
providing a hybrid powertrain battery, a vehicle accessory battery, and a prime mover driven generator adapted to charge the vehicle accessory battery;
monitoring the vehicle accessory battery's state of charge; and
activating the prime mover to drive the generator and recharge the vehicle accessory battery in response to the vehicle accessory battery's state of charge falling below a first predetermined level, or transferring electrical power from the hybrid powertrain battery to the vehicle accessory battery in response to the vehicle accessory battery's state of charge falling below a second predetermined level,
wherein the controlling means is configured to command the electrical power generating means to start and to drive the generator to charge the vehicle accessory battery; wherein the controller is configured to command the prime mover to turn off once the vehicle accessory battery has been charged to a third predetermined level; and further wherein the third predetermined level is greater than the second predetermined level, and the second predetermined level is greater than the first predetermined level.

18. The method of claim 17, wherein the monitoring step includes monitoring the vehicle accessory battery's state of charge using a battery control unit.

19. The method of claim 17, wherein the monitoring step includes monitoring the vehicle accessory battery's state of charge using a voltage or current measuring sensor.

20. The method of claim 17, wherein the prime mover driven generator is an alternator.

21. The method of claim 17, wherein the prime mover driven generator is a hybrid motor-generator.

22. The method of claim 17, wherein the step of transferring electrical power from the hybrid powertrain battery to the vehicle accessory battery includes converting the voltage provided by the hybrid powertrain battery.

23. The method of claim 17, wherein the activating and transferring steps are performed virtually simultaneously.

24. The battery control system of claim 1, wherein the prime mover is a traction motor.

25. The battery control system of claim 1, wherein the controller includes a voltage converter to convert a higher voltage of the hybrid powertrain battery to a voltage that can be used by the vehicle accessory battery.

26. The battery control system of claim 25, wherein the converter steps down the voltage from a 340 V hybrid powertrain battery to a 12 V vehicle accessory battery.

27. The battery control system of claim 1, wherein the generator is further configured to recharge the hybrid powertrain battery concurrently with the vehicle accessory battery.

* * * * *